(12) United States Patent
Allen et al.

(10) Patent No.: US 9,008,869 B2
(45) Date of Patent: *Apr. 14, 2015

(54) LOW-ALTITUDE ALTIMETER AND METHOD

(71) Applicant: University of Kansas, Lawrence, KS (US)

(72) Inventors: Christopher T. Allen, Lawrence, KS (US); Trenton Shuey, Overland, KS (US); Rongqing Hui, Lenexa, KS (US)

(73) Assignee: University of Kansas, Lawrence, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/069,641

(22) Filed: Nov. 1, 2013

(65) Prior Publication Data

US 2014/0058593 A1    Feb. 27, 2014

Related U.S. Application Data

(63) Continuation of application No. 13/476,539, filed on May 21, 2012, now Pat. No. 8,583,296.

(60) Provisional application No. 61/488,706, filed on May 21, 2011.

(51) Int. Cl.
*G01C 5/00*    (2006.01)
*G01B 9/08*    (2006.01)
*B64D 45/00*   (2006.01)

(52) U.S. Cl.
CPC   *G01B 9/08* (2013.01); *B64D 45/00* (2013.01); *G01C 5/005* (2013.01)

(58) Field of Classification Search
USPC .......................................................... 701/4
See application file for complete search history.

(56) References Cited

U.S. PATENT DOCUMENTS

| | | | |
|---|---|---|---|
| 4,081,214 A | | 3/1978 | Van Buskirk |
| 4,893,922 A | * | 1/1990 | Eichweber ............... 356/3.12 |

(Continued)

OTHER PUBLICATIONS

Markus-Christian Amann, Thierry Bosch, Marc Lescure, Risto Myllyla, Marc Rioux, Laser Ranging: a Critical Review of Usual Techniques for Distance Measurement, Optical Engineering, Jan. 2001, vol. 40 No. 1, pp. 10-19, Society of Photo-Optical Instrumentation Engineers.

(Continued)

*Primary Examiner* — Thomas Tarcza
*Assistant Examiner* — Alex C Dunn
(74) *Attorney, Agent, or Firm* — Spencer Fane Britt Browne LLP

(57) ABSTRACT

A low-altitude altimeter (10) and a method of determining low altitudes for unmanned aerial vehicles (24). The altimeter includes at least two illuminators (12, 14), at least one sensor (16), and a computing device (18). The illuminators (12, 14) emit signals which are received by the sensor (16) in such a way that an angle at which they are received is determinable by the computing device (18). The computing device (18) processes each signal received by the sensor (16), determines the angle at which the sensor (16) received the signal, and, based thereon, determines the altitude of the unmanned aerial vehicle (24). When a first pair of illuminators are arranged along a fuselage axis, and a second pair of illuminators are arranged orthogonally to that axis, the computing device can combine first and second altitude, pitch angle, and roll angle measurements to provide a more refined altitude determination.

17 Claims, 5 Drawing Sheets

(56) References Cited

U.S. PATENT DOCUMENTS

| | | | | |
|---|---|---|---|---|
| 5,200,792 | A * | 4/1993 | Tajima et al. | 356/3.01 |
| 5,526,000 | A * | 6/1996 | Chazelle et al. | 342/407 |
| 5,793,034 | A * | 8/1998 | Wesolowicz et al. | 250/216 |
| 5,805,287 | A * | 9/1998 | Pettersen et al. | 356/614 |
| 5,922,031 | A * | 7/1999 | Larrieu | 701/3 |
| 6,148,250 | A * | 11/2000 | Saneyoshi et al. | 701/4 |
| 6,216,064 | B1 * | 4/2001 | Johnson et al. | 701/4 |
| 6,396,577 | B1 * | 5/2002 | Ramstack | 356/141.1 |
| 6,630,993 | B1 * | 10/2003 | Hedges et al. | 356/141.4 |
| 6,653,970 | B1 * | 11/2003 | Mitra | 342/22 |
| 6,658,329 | B1 | 12/2003 | Howard | |
| 6,694,228 | B2 * | 2/2004 | Rios | 701/2 |
| 6,714,663 | B1 * | 3/2004 | Bornowski | 382/106 |
| 7,248,341 | B2 * | 7/2007 | Perry | 356/4.01 |
| 7,302,316 | B2 * | 11/2007 | Beard et al. | 701/11 |
| 7,379,796 | B2 * | 5/2008 | Walsdorf et al. | 701/9 |
| 7,400,950 | B2 | 7/2008 | Reich | |
| 2002/0060788 | A1 * | 5/2002 | Ohtomo et al. | 356/139.1 |
| 2010/0283998 | A1 * | 11/2010 | Souchkov et al. | 356/141.2 |

OTHER PUBLICATIONS

Paul J. Besl, Active, Optical Range Imaging Sensors, Machine Vision and Applications 1988 vol. 1, pp. 127-152, Springer-Verlag, New York Inc.

H. Lamela, J.R. Lopez, E. Garcia, and M.A. Ferreras; Optoelectronic Instrumentation Systems in an Autonomous Unmanned Aerial Vehicle (AUAV), 1998, pp. 1342-1345.

A. Blake, D. McCowen, H.R. Lo, and P.J. Lindsey; Trinocular Active Range-Sensing; IEEE Transactions on Pattern Analysis and Machine Intelligence, vol. 15, No. 5, May 1993, pp. 477-483.

Thomas C. Bryan, Richard T. Howard, and Michael L. Book; Laser Range and Bearing Finder with No Moving Parts; Marshall Space Flight Center, Alabama, Sep. 1, 2007; www.techbriefs.com/component/content/article2171.

Ernesto Garcia and Horacio Lamela; Low-cost Three Dimensional Vision System Based on a Low-Power Semiconductor Laser Rangefinder and a Single Scanning Mirror; Optical Engineering, Jan. 2001, vol. 1, pp. 61-66, Society of Photo-Optical Instrumentation Engineers.

Miniature Radar Altimeter, MRA Type 2, dated Apr. 14, 2011, www.roke.co.uk, Roke Manor Research Limited, Romsey, Hampshire, UK, Issue 04-000, May 2012.

Universal Laser Sensor (ULS) Specifications, www.lasertech.com/Universal-Laser-Sensor-Specs.aspx, Dec. 3, 2012.

Devantech SRF08 UltraSonic Ranger, Feb. 28, 2003, www.jk-sensor.com.

HeliCommand: User Manual HeliCommand Profi, version 2.5", dated Jun. 15, 2010, Captron Electronic GmbH, Olching, Germany.

Tanner, E.; Granade, S.; Whitehead, Charles A.; Autonomous Rendezvous and Docking Sensor Suite; vol. 5086, Aug. 2003, Advanced Optical Systems, Huntsville, Alabama.

M. Nagai, T. Chan, R. Shibasaki, R. Kumaal, A. Ahmed, "UAV-Borne 3-Mapping System by Multisensor Integration", IEEE, Transactions on Geoscience and Remote Sensing, Mar. 2009, vol. 47, No. 3.

R. Zhang, H. Liu, "Vision Based Relative Altitude Estimation of Small Unmanned Aerial Vehicles in Target Localization", American Control Conference, Jun. 29-Jul. 1, 2011.

* cited by examiner

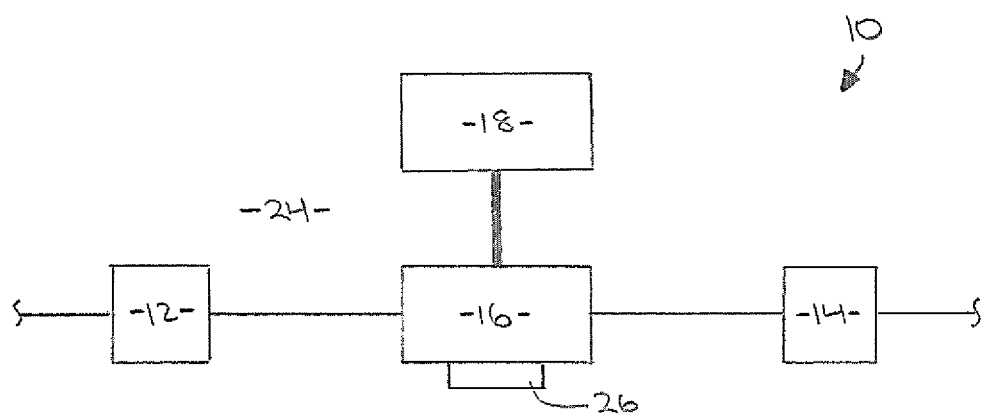

$xf = uD$

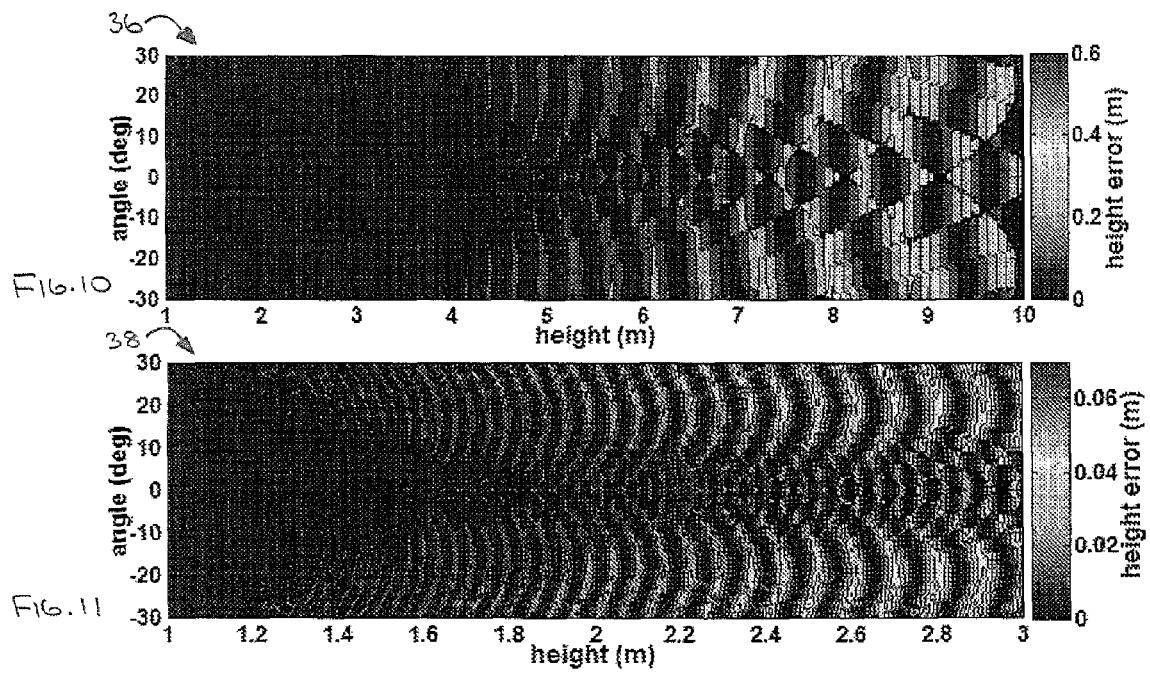
FIG. 10
FIG. 11
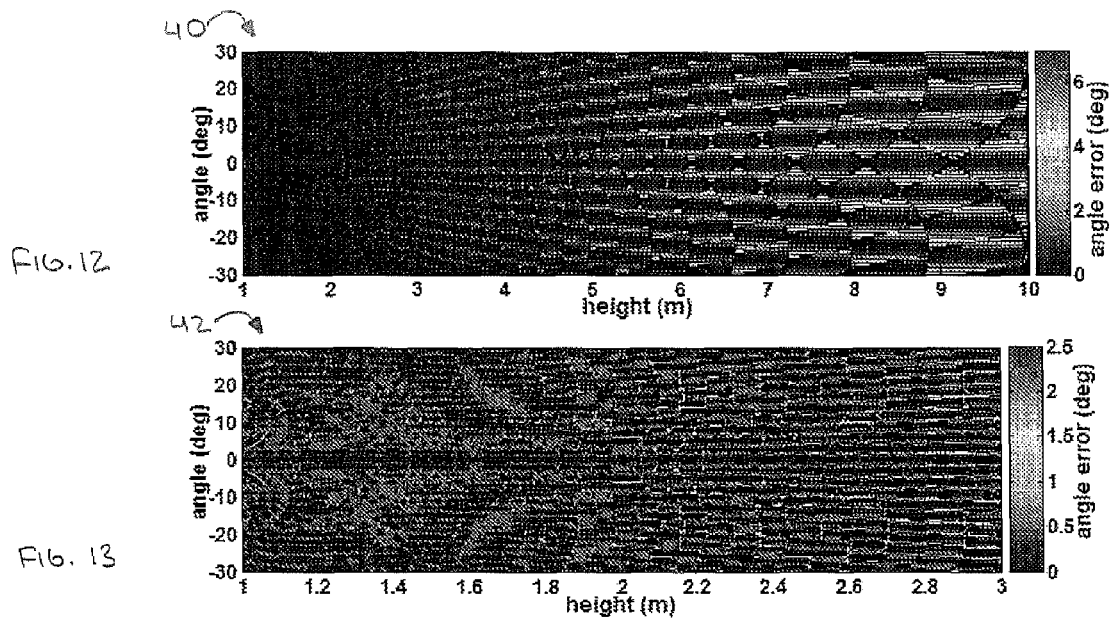
FIG. 12
FIG. 13

LOW-ALTITUDE ALTIMETER AND METHOD

RELATED APPLICATIONS

The present non-provisional patent application is a continuation patent application of application Ser. No. 13/476,539, filed May 21, 2012, titled LOW ALTIMETER SYSTEM & METHOD, now U.S. Pat. No. 8,583,296, which application claims priority benefit of earlier-filed provisional patent application titled LOW ALTIMETER SYSTEM & METHOD, Ser. No. 61/488,706, filed May 21, 2011. Both identified earlier-filed applications are hereby incorporated by reference into the present continuation application.

BACKGROUND OF THE INVENTION

1. Field

The present invention relates generally to altimeters and methods for providing altitude information.

2. Background

Unmanned aerial vehicles (UAVs) play an increasingly valuable role in a wide range of commercial, governmental, military, and science applications. In comparison to manned aircraft, UAVs offer many advantages, including reduced initial and operating costs, versatile basing and storage options, reduced visible and radar signatures, ease of transport, and increased suitability for operation in hazardous environments. However, despite these advantages, various limitations have decreased the acceptance and adoption of UAVs.

One such limitation is the need for skilled operators to launch and, more importantly, land the aircraft. Pilots, or "operators", of UAVs are often trained using flight simulation programs and actual flying or handling time. Novice operators are more likely to crash or make other mistakes during actual launching and landing training. Unlike a manned aircraft in which the pilot uses visual markers, a UAV operator must rely on information sensed by the UAV, relayed to the control and navigation processing system, and displayed to the operator. Operators often have difficulty anticipating or avoiding low altitude obstacles, and must rely on the UAV's control and navigation processing system to accurately identify the obstacles and display the information in a form that is useful to the operators. Alternatively, UAVs may be landed by distant operators using visual cues to infer altitude, attitude, and other relevant parameters.

Consumer global positioning systems (GPSs) have an average uncertainty of three meters, and, as such, a UAV navigation and control system is needed for altitudes below approximately six meters. Thus, the operating range of such a system is from ground level (approximately zero meters) to six meters above the local, flight path terrain. Known navigation and altimeter technologies include radar systems, lidars, acoustic sensors, and infrared range sensors, each of which offers unique advantages and disadvantages. Radar systems offer all-weather capability and immunity to visual obstacles such as smoke, haze, and fog, but can be susceptible to jamming, can be confused by low-reflectivity surfaces (e.g., dry sand or snow), and can be relatively heavy. An example of a small radar system is Roke Manor Research Ltd.'s Miniature Radar Altimeter Type 2, which operates at a frequency of 77-GHz frequency with an update rate of 10 Hz, and has range accuracy of 2 cm for ranges from 20 cm to 100 m. This system, with its integrated antennas, measures 5.5 in.×3 in.× 1.8 in., weighs 14.1 oz., and consumes about 3 W.

Lidars offer fine range accuracy, but, unless they are gimbaled or utilize beam scanning, their measurements of height may be corrupted by unknown aircraft attitudes. An example of a non-scanning lidar system is Laser Technology Inc.'s Universal Laser Sensor (ULS), which operates at a wavelength of 905 nm with a range accuracy of 2 cm for ranges from 46 cm to 500 m. This system measures 5.3 in.×4.7 in.×2.5 in., weighs 28.2 oz., and consumes about 2 W.

Acoustic sensors are compact and accurate, but their performance may be degraded by noise due to wind, turbulence, vibration, or engines (on the host vehicle or a nearby vehicle). Additionally, acoustic sensors may interfere with other aircraft systems through electromagnetic or radio-frequency coupling. An example of an acoustic sensor is Devantech's SRF08 High Performance Ultrasonic Range Finder, which operates at a frequency of 40 kHz and provides a range accuracy of 3 cm over a 3 cm to 6 m. This low-cost component measures 1.7 in.×0.8 in.×0.7 in., weighs 0.4 oz., and consumes about 0.1 W. However, the power, processing, or external interfacing systems are not included in the size, weight, or power specifications.

Infrared range sensors are limited by the working distances of the sensors. HeliCommand's Profi-series senses platform motion to enable stabilization, its four optical imaging systems analyze scene features in images collected using ambient lighting, it uses a 3-axis accelerometer and gyroscopes, and a barometric altimeter provides altitude. This system operates at heights up to 30 m. This system, which was designed for radio-controlled helicopters, measures 2.9 in. height×2.9 in. diameter, weighs 8.1 oz., and consumes approximately 1 W. An optional infrared range sensor provides altitude data up to 1.5 m above local terrain with a range accuracy of 10 cm.

Some prior art systems measure round-trip time-of-flight to determine target range. Precise range measurements under this approach require combinations of modulated microwave, millimeter-wave, or optical sources in conjunction with high-speed electronics or radio-frequency (RF) signal processing, which drives system complexity and cost. Furthermore, the microwave, millimeter-wave, or radio signals may interfere with other sensing or communication equipment.

To assist with spacecraft docking maneuvers, NASA has developed an Advanced Video Guidance Sensor (AVGS) sensor that includes a laser illuminator, retroreflectors, and a camera array coupled to signal processors to determine target range and bearing. The AVGS provides a range accuracy of about 1% of the measured range for ranges from less than 1 m to beyond 100 m. However, the AVGS weighs 20 pounds and requires retroreflectors, both of which make it impractical for use on small UAVs. Other NASA laser and bearing finders involve time-of-flight measurement to determine target range, and are also not appropriate for use on small UAVs due to their relatively high weight and cost Thus, there is a need for an improved system and method to better enable persons, especially those with minimal training, to avoid low altitude obstacles during the launch, flight, and landing of UAVs.

SUMMARY OF THE INVENTION

The present invention provides a low-altitude altimeter and a method of determining low altitudes for UAVs. The altimeter broadly comprises at least two illuminators, with each illuminator being operable to emit a signal; at least one sensor operable to receive the signals emitted by the illuminators in such a way that an angle at which the sensor received each of the signals is determinable; and at least one computing device in communication with the sensor and operable determine the angle at which the sensor received each of the signals, and, based thereon, determine the altitude. Thus, the method of determining low altitudes broadly comprises the steps of emitting first and second signals from the UAV toward the underlying terrain; receiving the first and second signals at the UAV; determining a first angle at which the first signal was received and a second angle at which the second signal was received; and determining the altitude of the UAV as a function of the first and second angles.

In various embodiments, the altimeter of the present invention may alternatively or additionally include any one or more of the following features. The illuminators and the sensor may be mounted to an undersurface of the UAV and spaced apart a known distance. The sensor may be located between the illuminators. The illuminators may be lasers, and the sensor may be a digital camera. The digital camera may utilize charge-coupled device technology or photodiode array technology. The altimeter may further include a filter operable to pass to the sensor a limited range of wavelengths that includes the wavelengths of the signals emitted by the illuminators. The altimeter may include two illuminators and one one-dimensional sensor, four illuminators and two one-dimensional sensors, or four illuminators and one two-dimensional sensor.

The angle of at which the sensor receives the signals may be represented in pixel data, and the computing device may be operable to convert the pixel data into the altitude of the UAV. The process of converting the pixel data into the altitude may involve performing an analytical conversion in an iterative fashion while making simplifying assumptions about altitude values until a result is obtained within a required degree of accuracy. Additionally or alternatively, the process of converting pixel data into the altitude may involve constructing a look-up table whose cells contain values for altitude and relative angles between the terrain and a distance between the illuminators and the sensor, and whose address is determined by index numbers associated with illuminated pixels. The look-up table comprises a plurality of memory cells, and the size of the look-up table is determined by the number of discrete pixel values in the sensor, and the depth of each memory cell is determined by the height and angle resolutions of the altimeter.

In one embodiment, the altimeter may include four illuminators and one or two sensors (i.e., two one-dimensional sensors or one two-dimensional sensor), orthogonally arranged to measure height, pitch angle, and roll angle, and the computing device may be operable to combine the height, pitch angle, and roll angle measurements to determine the altitude of the UAV. The first pair of illuminators may be aligned with the aircraft's fuselage axis to measure the pitch angle, and the second pair of illuminators may be aligned orthogonally to the fuselage axis to measure the roll angle.

These and other features of the present invention are discussed in detail in the section titled DETAILED DESCRIPTION, below.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

FIG. 1 is a high level block diagram of components of an embodiment of the altimeter the present invention.

FIG. 10 shows errors in simulated height measurements versus actual height and angle over a height range of 1 m to 10 m.

FIG. 11 shows errors in simulated height measurements versus actual height and angle over a height range of 1 m to 3 m.

FIG. 12 shows errors in simulated angle measurements versus actual height and angle over the height range of 1 m to 10 m.

FIG. 13 shows errors in simulated angle measurements versus actual height and angle over the height range of 1 m to 3 m.

DETAILED DESCRIPTION

Figure 3:
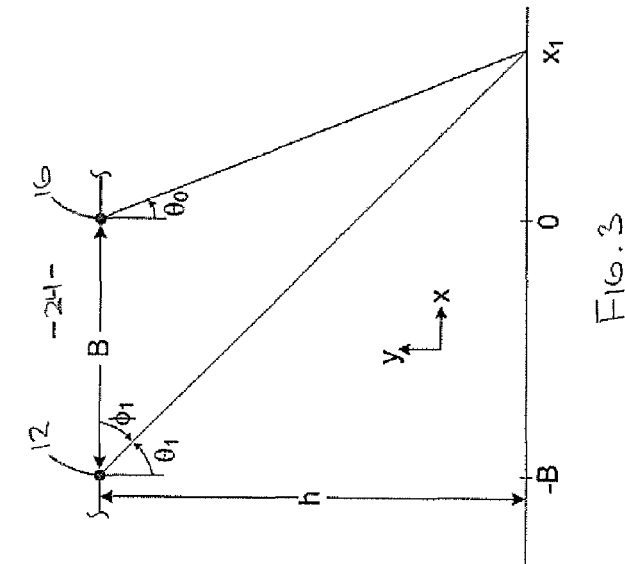
FIG. 3 is a graphical representation of a one-beam embodiment of the altimeter of the present invention using a single illuminator and a sensor to determine an aircraft's height.

With reference to the various drawing figures, a low-altitude altimeter and method of determining low altitude is herein described, shown, and otherwise disclosed in accordance with one or more preferred embodiments of the present invention. Referring to FIG. 1, the present invention broadly comprises an altimeter 10 comprising at least two illuminators 12, 14, at least one sensor 16, and at least one computing device 18 connected to the sensor 16. The altimeter implements the method of determining low altitude, which broadly comprises the steps of emitting first and second signals from the UAV toward the underlying terrain; receiving the first and second signals at the UAV; determining a first angle at which the first signal was received and a second angle at which the second signal was received; and determining the altitude of the UAV as a function of the first and second angles.

More specifically, the illuminators 12, 14 and the sensor 16 are mounted to an undersurface of a UAV 24 or other aircraft such that the illuminators 12, 14 and the sensor 16 are spaced apart a known baseline distance. Each illuminator 12, 14 is operable to emit a signal. The illuminators 12, 14 may be, for example, lasers. The sensor 16 is operable to receive the signals emitted by the illuminators 12, 14 in such a way that the angle at which the sensor 16 received each signal is determinable. The sensor 16 may be, for example, a digital camera. The system 10 may further include a filter 26 on the sensor 16 to pass a limited range of wavelengths that includes the wavelength(s) of the signals emitted by the illuminators 12, 14. In various embodiments, the altimeter 10 may include two illuminators and one one-dimensional sensor, four illuminators and two one-dimensional sensors, or four illuminators and one two-dimensional sensor.

While optical (e.g., laser) illuminators are small, lightweight, low cost, and reliable, the performance of optical illuminators and the optical sensors can be limited by fog, haze, smoke, blowing snow, and the like, as well as by dirt, grime, frost, and other coatings. Furthermore, ambient light can limit the sensor's ability to reliably detect the illuminator's spot on the terrain. Various options are available to boost the signal-to-noise ratio or dynamic range of the sensor. These include boosting the illuminator's optical power output within eye-safety limits; selectively limiting the optical signal entering the sensor with a narrow-band optical filter whose passband matches the spectral properties of the illuminator; or suppressing the effects of the ambient light through signal processing of multiple samples. Also, periodically modulating the intensity of the illuminators allows for using phase and frequency lock-in techniques to increase the signal-to-noise ratio.

The altimeter's measurement rate is limited by the sensor's readout time and the time required to identify which pixels contain the imaged illuminator spots. Sensors based on charge-coupled device (CCD) technology may operate slower than sensors based on photodiode array technology. Furthermore, if the sensor is a line camera, it may quantize the angle of arrival to discrete values, which may introduce quantization noise that can limit the resolution and degrade the accuracy of both height and angle measurements. Analysis or experimental investigation can be conducted to identify the angular resolution (i.e., pixel size and field of view) required to achieve specific height and angular accuracies.

It should also be noted that measurement accuracy is dependent on constant and known illumination angles ($\phi 1$, and $\phi 2$). Variations in the geometrical relationships between the illuminators 12, 14 and the sensors 16 can degrade performance. For example, if the illuminators 12, 14 are located near the UAV's wingtips to maximize the baseline distance, and the sensor 16 is positioned beneath the fuselage, then wing flexure during flight could change the illumination angle and affect performance.

The computing device 18 is operable to process each signal received by the sensor 16, determine the angle at which the sensor 16 received the signal, and, based thereon, determine the altitude of the UAV 24. The computing device 18 may be, for example, a microcomputer. In one embodiment, the angle of at which the sensor 16 receives the illuminator signal is represented in pixel data, and the computing device 18 is operable to convert the pixel data into altitude information.

Figure 2:
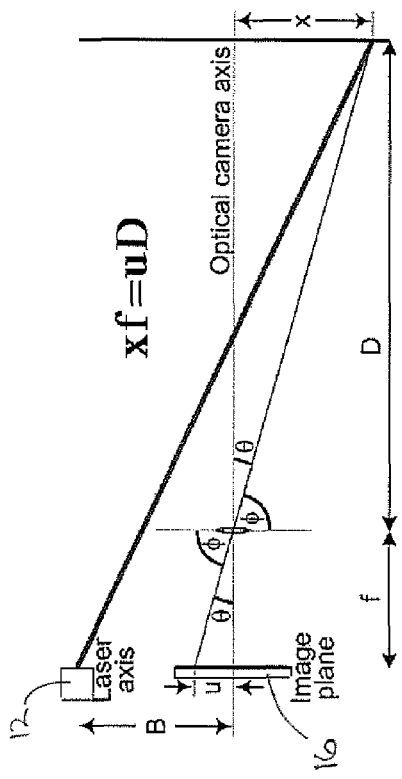
FIG. 2 is a graphical representation of a process of optical triangulation.

The present invention utilizes optical triangulation to provide reliable altitude-above-terrain data. Referring to FIG. 2, using a laser as the illuminator 12 and a one-dimensional line camera as the sensor 16, arranged so that the laser 12 is spaced apart from the camera 16, the distance from a surface is a function of the scattered laser signal's angle-of-arrival, $\theta$, as observed by the camera 16.

Referring to FIG. 3, for a known and level baseline, B, offset between the laser 12 and the camera 16, and a known laser illumination angle, $\theta_1$, the height, h, above the local terrain is:

$$h = \frac{B}{\tan\theta_1 - \tan\theta_0},$$

where $\theta_0$ is the angle that the signal enters the camera 16 as determined from the number, u, of illuminated pixels. However, unknown variations in platform attitude (e.g., roll, pitch) or an inclined terrain will distort the baseline alignment and affect the altitude estimate.

Figure 4:
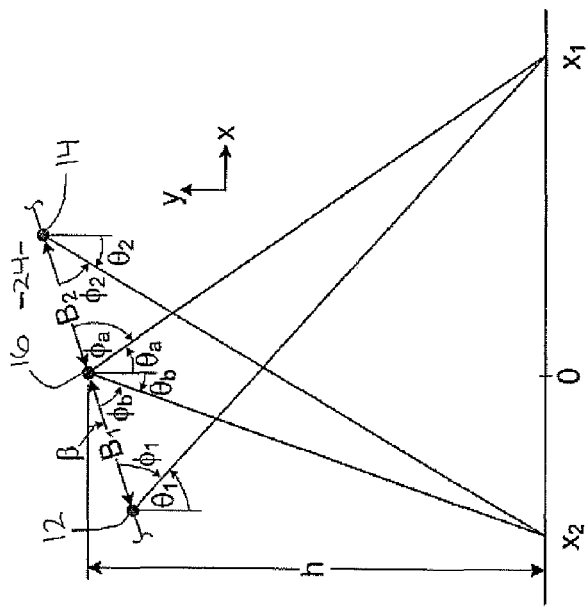
FIG. 4 is a graphical representation of a two-beam embodiment of the altimeter of the present invention using two illuminators and a sensor to determine an aircraft's height and an angle between a terrain and the sensor's reference.

Referring to FIG. 4, to overcome problems due to variations in platform attitude or sloping terrain, a second laser 14 is added. In this embodiment, a line camera 16 is positioned between the two lasers 12, 14, and all are aligned such that the laser beams and the line camera's image field of view lie in a common plane. The two unknown variables, height, h, and the relative angle, $\beta$, between the terrain and the sensor baseline can be found by solving two equations:

$$\cot_{(\phi_a - \beta)} = -\frac{B_1}{h}\cos\beta + \left(1 - \frac{B_1 \sin\beta}{h}\right)\cot_{(\phi_1 - \beta)}$$

and $$\cot_{(\phi_b + \beta)} = -\frac{B_2}{h}\cos\beta + \left(1 + \frac{B_2 \sin\beta}{h}\right)\cot(\phi_2 + \beta),$$

where $B_1$, $B_2$, $\phi_1$, and $\phi_2$ are known, and $\phi_a$ and $\phi_b$, are measured by the line camera 16.

Conversion of the measured pixel numbers, u, or angles-of-arrival, $\theta$, to yield height above terrain, h, and the relative angle, $\beta$, between the terrain and the sensor baseline can be accomplished by at least two alternative processes, either or both of which can performed by the computing device 18. A first process involves performing an analytical conversion in an iterative fashion, making simplifying assumptions about the values of h, until results are obtained within the required degree of accuracy. A second process involves constructing a look-up table (LUT) whose cells contain values for h and $\beta$, and whose address is determined by the index numbers of the illuminated pixels. The LUT can be populated with values determined from numerical simulations of the concept with specific system values (e.g., B1, B2, $\phi 1$, $\phi 2$, and relevant camera parameters), or the LUT can be populated with values determined experimentally during a calibration process. Because the LUT approach involves less real-time processing, it would result in shorter delays between data collection and height and angle readings.

The LUT's size is determined by the number of discrete pixel values in the line camera 16, and the depth of each memory cell is determined by the height and angle resolutions of the altimeter 10. For example, one implementation of the altimeter of the present invention uses Texas Advanced Optoelectronic Solutions' TSL1401R-LF linear sensor array comprising a 128×1 array of photodiodes. This array is packaged into the TSL1401-DB linescan imaging daughterboard which includes a 7.9 mm focal-length imaging lens that provides a 53° field of view. When processed using binary interpolation, the number of resolvable pixels, Npix, is 255. Therefore, the LUT memory address is represented by two 8 bit ($2^8$=256) values or one 16 bit word, addressing 216 or 65,536 unique cells. For the case in which the height is resolved in 1 cm increments over the range of 1 m to 7 m (601 possible values or 10 bits) and the angle is resolved in 1° increments over the range of ±30° (61 values or 6 bits), each cell must contain 16 bits of data. Thus, for this example implementation, the LUT could be held in a 1 Mb (64 K×16 b) read-only memory (ROM). A suitable memory would be Atmel's AT27C1024-70JU, which is a 1 Mb (arranged as 64-K×16 b) EEPROM with a 70 ns memory access time in a 44 pin plastic leadless chip carrier (PLCC) and an operational temperature range of −40° C. to 85° C.

Figure 5:
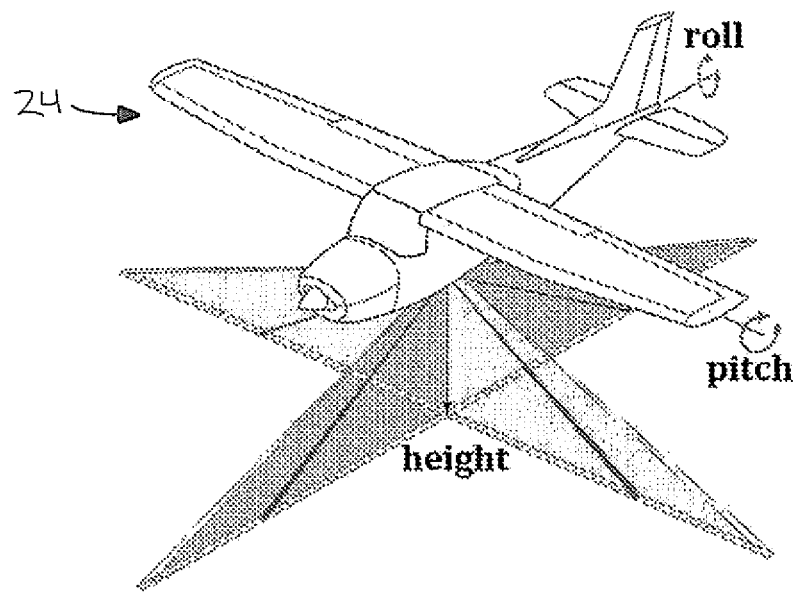
FIG. 5 is a perspective view of an aircraft employing a four-beam embodiment of the present invention for simultaneously measuring roll, pitch, and height-above-terrain.
Figure 6:
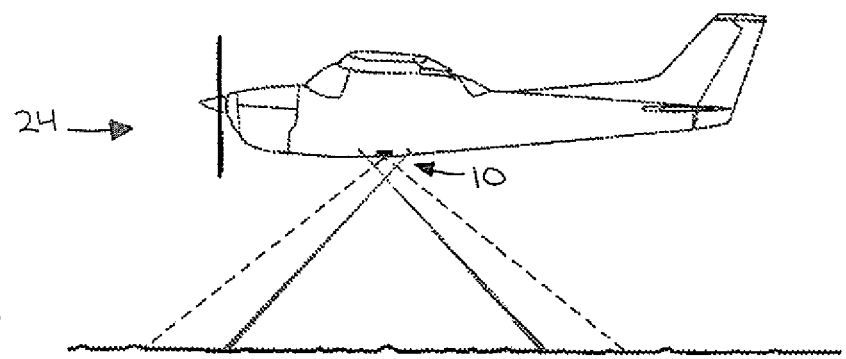
FIG. 6 is a side elevation view of the four-beam embodiment of FIG. 5.
Figure 7:
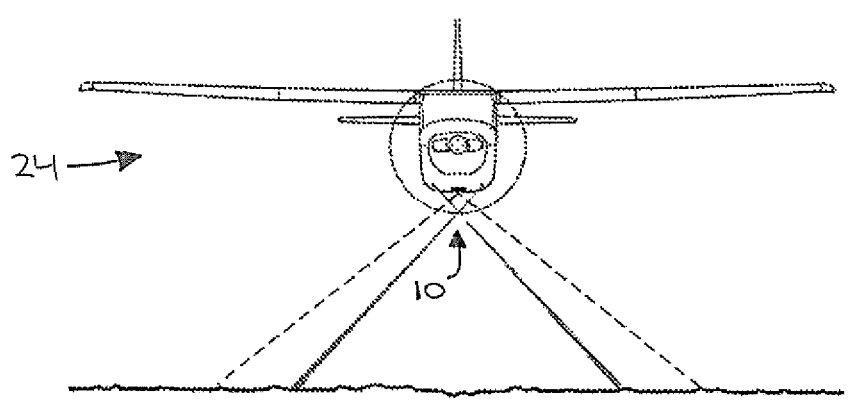
FIG. 7 is a front elevation view of the four-beam embodiment of FIG. 5.

A UAV has two unknown attitude angles (i.e., roll and pitch) that can each affect the height measurement. Referring to FIGS. 5, 6, and 7, to address this issue, an embodiment of the altimeter of present invention includes four illuminators and one or two sensors (i.e., two one-dimensional sensors or one two-dimensional sensor), orthogonally arranged to independently measure height, pitch angle, and roll angle. The two independent height measures are both affected by the out-of-plane angle, but can be combined with the pitch and roll measurements to remove the angular effects and provide a single refined altitude estimate. As shown in FIGS. 5, 6, and 7, one pair of beams may be aligned with the UAV's fuselage axis to sense pitch angle, and the second pair of beams may be aligned orthogonally to that axis to sense roll angle. Data conversion for this arrangement would require two independent LUTs, with one LUT assigned to each pair of illuminators. This embodiment is particularly useful because it can provide real-time altitude and attitude data to an autopilot during autolanding of the UAV.

The altimeter 10 of the present invention is ideally suited for low-altitude operation of approximately ten meters or less. Performance at higher altitudes may be limited due to the relatively short baseline, B, between the illuminators 12, 14 and the sensor 16, and due to the diminished ability to reliably detect the projected optical spot at higher altitudes. One way to improve measurement accuracy is to increase the length of the baseline, B. However, a UAV's position and local terrain elevation are typically accurately known through GPS to within approximately between 3 m and 10 m, so the finer resolution provided by the altimeter 10 of the present invention is only required at certain times (i.e., when the altitude is less than 10 m), such as during the terminal portion of the landing approach.

Numerical simulations were performed in MATLAB to analyze and predict system performance. The results discussed below address effects of geometry and measured angle quantization, but do not address optical signal power or received signal-to-noise ratio. The results shown are from simulations using the following system parameters: $B1=B2=30$ cm, $\phi_1=\phi_2=65°$, sensor's field of view=53°, Npix=255, and angular resolution=0.21°. Height was varied from 1 m to 10 m in 1 cm steps, and angle was varied from −30° to +30° in 1° steps.

In one simulation, a LUT was built containing height and angle data derived by simulating the measurement geometry and determining which two pixels in the array would detect the illuminated spots, thus simulating pixel quantization effects. Measurement errors were then determined by comparing true heights and angles from estimated LUT values.

Figure 8:
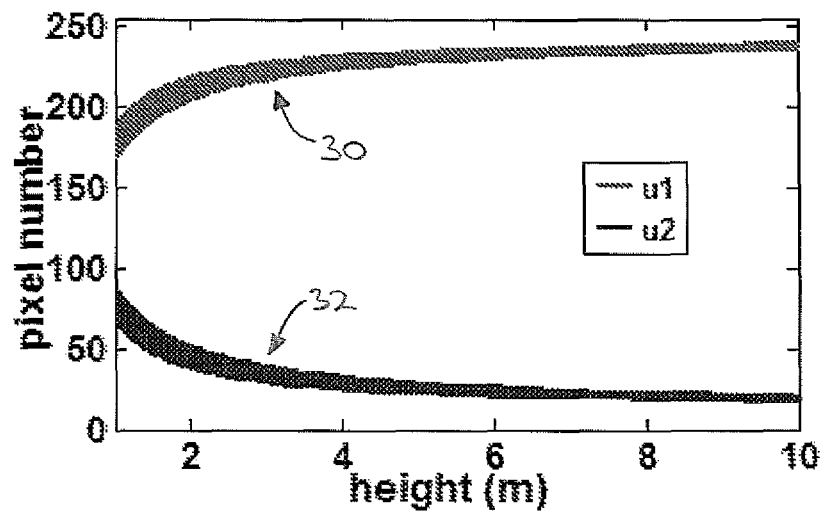
FIG. 8 shows a distribution of pixel numbers, u1 and u2, over a range of simulated heights and angles.
Figure 9:
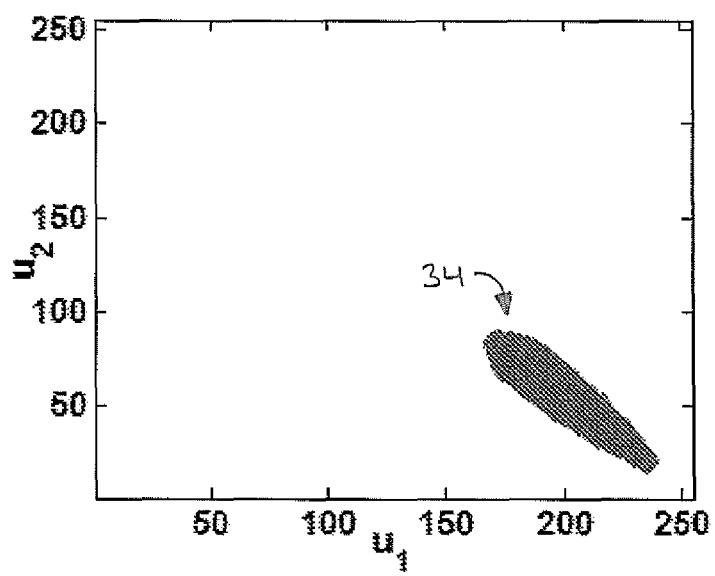
FIG. 9 is a graphical depiction of look-up table addresses required to store the height and angle data corresponding to the distributions of pixel numbers shown in FIG. 8.

FIG. 8 shows a first distribution 30 of pixel numbers, u1, and a second distribution 32 of pixel numbers, u2, corresponding to the imaged spot locations from the two beams over the full range of simulated heights and angles. Note that the imaged spots never illuminate some of the camera's pixels in this simulation. FIG. 9 graphically shows where useable height and angle data values 34 would be recorded in the LUT. Note that only approximately 1700 of the 64K locations are used.

FIGS. 10 and 11 show the magnitude of the error in measured heights as a function of true height and angle. FIG. 10 shows the height errors 36 over the full 1 m to 10 m height range. Over this range the maximum height error of 62 cm occurs at an 8.8 m height and a 30° angle, corresponding to a 7% maximum error. FIG. 11 shows the height errors 38 over the 1 m to 3 m height range. Over this range the maximum height error of 7.4 cm occurs at a 2.98 m height and a 30° angle, corresponding to a 2.5% error maximum. Over all ranges the height measurement error has a 2 cm standard deviation, while in the 1 m to 3 m range the height measurement error is 0.3 mm.

FIGS. 12 and 13 show the magnitude of the error in measured angle as a function of true height and angle. FIG. 12 shows the angle errors 40 over the full 1 m to 10 m height range. Over this range the maximum angle error of 8° occurs at a 9.6 m height and an 8° angle, corresponding to a 100% maximum error. FIG. 13 shows the angle errors 42 over the 1 m to 3 m height range. Over this range the maximum angle error of 2.9° occurs at a 2.94 m height and a 6° angle, corresponding to a 48% error maximum. Overall the angle measurement error has a 4.4° standard deviation, while in the 1 m to 3 m height range the angle measurement error is 0.9°.

It will be appreciated that the altimeter of the present invention can be used for applications other than in UAVs. Furthermore, the altimeter can be fabricated in various sizes and from a wide range of suitable components and materials, using various manufacturing and fabrication techniques. Thus, although the invention has been disclosed with reference to various particular embodiments, it is understood that equivalents may be employed and substitutions made herein without departing from the contemplated scope of the invention.

Having thus described the invention, what is claimed as new and desired to be secured by Letters Patent is:

1. An altimeter comprising:
   at least two illuminators, with each illuminator operable to emit a signal;
   a downwardly orientable sensor operable to receive the signals emitted by the illuminators and sense data pertaining to angles from which the sensor received each of the signals; and
   a computing device in communication with the sensor and operable to determine the angle at which the sensor received each of the signals, and, based thereon, to determine an altitude.

2. The altimeter as set forth in claim 1, wherein the illuminators and the sensor are mounted to an undersurface of an aircraft and spaced apart a known distance.

3. The altimeter as set forth in claim 1, wherein the sensor is located between the illuminators.

4. The altimeter as set forth in claim 1, wherein the illuminators are lasers.

5. The altimeter as set forth in claim 1, wherein the sensor is a digital camera.

6. The altimeter as set forth in claim 1, further including a filter operable to pass to the sensor a limited range of wavelengths that includes the wavelengths of the signals emitted by the illuminators.

7. The altimeter as set forth in claim 1, wherein the altimeter includes two illuminators and one one-dimensional sensor.

8. The altimeter as set forth in claim 1, wherein the altimeter includes four illuminators and two one-dimensional sensors.

9. The altimeter as set forth in claim 1, wherein the altimeter includes four illuminators and one two-dimensional sensor.

10. The altimeter as set forth in claim 1, wherein the angle at which the sensor received the signals is represented in pixel data, and the computing device is operable to convert the pixel data into the altitude.

11. The altimeter as set forth in claim 1, wherein the altimeter includes four illuminators and two sensors, orthogonally arranged to measure height, pitch angle, and roll angle, and wherein the computing device is operable to combine the height, pitch angle, and roll angle measurements to determine the altitude.

12. The altimeter as set forth in claim 11, wherein the illuminators and the sensor are mounted to an undersurface of an aircraft, and wherein a first two of the illuminators are aligned with a fuselage axis of the aircraft to measure the pitch angle, and a second pair of the illuminators are aligned orthogonally to the fuselage axis to measure the roll angle.

13. A method of determining an altitude of an unmanned aerial vehicle, the method comprising the steps of:
(a) emitting a first signal and a second signal from the unmanned aerial vehicle toward a terrain;
(b) detecting the first signal and the second signal at the unmanned aerial vehicle;
(c) determining a first angle at which the first signal was detected and a second angle at which the second signal was detected; and
(d) determining the altitude of the unmanned aerial vehicle as a function of the first and second angles.

14. The method according to claim 13 further comprising mounting a sensor to an underside of the unmanned aerial vehicle, the sensor detecting the first signal and the second signal.

15. The method according to claim 14 further comprising representing an angle at which the sensor received the signals in pixel data.

16. The method according to claim 13 wherein emitting a first signal and a second signal comprises emitting a first laser signal and a second laser signal.

17. A method of determining an altitude of an unmanned aerial vehicle, the method comprising the steps of:
(a) emitting a first signal and a second signal from the unmanned aerial vehicle toward a terrain;
(b) detecting the first signal and the second signal at the unmanned aerial vehicle;
(c) determining a first angle at which the first signal was detected and a second angle at which the second signal was detected;
(d) determining the altitude of the unmanned aerial vehicle as a function of the first and second angles; and
(e) mounting a sensor to an underside of the unmanned aerial vehicle, the sensor detecting the first signal and the second signal.

* * * * *